(12) United States Patent
Bancel et al.

(10) Patent No.: US 7,512,852 B2
(45) Date of Patent: Mar. 31, 2009

(54) PROTECTING AN INTEGRATED CIRCUIT TEST MODE

(75) Inventors: Frédéric Bancel, Lamanon (FR); David Hely, Marseille (FR)

(73) Assignee: STMicroelectronics S.A., Montrouge (FR)

(*) Notice: Subject to any disclaimer, the term of this patent is extended or adjusted under 35 U.S.C. 154(b) by 294 days.

(21) Appl. No.: 11/041,514

(22) Filed: Jan. 24, 2005

(65) Prior Publication Data

US 2005/0169076 A1    Aug. 4, 2005

(30) Foreign Application Priority Data

Jan. 29, 2004    (FR) .................................. 04 00836

(51) Int. Cl.
G01R 31/28    (2006.01)

(52) U.S. Cl. ........................................ 714/726; 714/733

(58) Field of Classification Search ......... 714/724–734; 713/189, 194
See application file for complete search history.

(56) References Cited

U.S. PATENT DOCUMENTS

| | | | |
|---|---|---|---|
| 5,357,572 A | | 10/1994 | Bianco et al. |
| 5,452,355 A | * | 9/1995 | Coli ............................. 713/194 |
| 6,005,814 A | * | 12/1999 | Mulholland et al. ......... 365/201 |
| 6,466,048 B1 | * | 10/2002 | Goodman ....................... 326/8 |
| 6,496,119 B1 | | 12/2002 | Otterstedt et al. |
| 6,510,090 B1 | * | 1/2003 | Chida ......................... 365/195 |
| 6,829,730 B2 | * | 12/2004 | Nadeau-Dostie et al. ...... 714/30 |
| 7,003,707 B2 | * | 2/2006 | Whetsel ....................... 714/727 |
| 7,039,816 B2 | * | 5/2006 | Kocher et al. ............... 713/194 |
| 7,076,667 B1 | * | 7/2006 | Gama et al. .................. 713/193 |
| 7,155,644 B2 | * | 12/2006 | Roohparvar ................. 714/718 |
| 2003/0204801 A1 | | 10/2003 | Tkacik et al. |
| 2003/0218475 A1 | | 11/2003 | Gammel |

(Continued)

FOREIGN PATENT DOCUMENTS

EP    1 089 083 A1    4/2001

(Continued)

OTHER PUBLICATIONS

"Automatic Test Equipment (ATE) on a Network (securing access to equipment and data)" by McCarty, Autotestcon Proceedings, 2000 IEEE Publication Date: 2000 On pp. 490-496 ISBN: 0-7803-5868-6 INSPEC Accession No. 6812928.*

(Continued)

*Primary Examiner*—Cynthia Britt
(74) *Attorney, Agent, or Firm*—Lisa K. Jorgenson; James H. Morris; Wolf, Greenfield & Sacks, P.C.

(57) ABSTRACT

An electronic circuit, including; a logic circuit having a plurality of logic cells; storage cells able to form a shift register, able to be connected to the logic cells; a connecting control module having an input for the reception of an identification key, the module connecting the storage cells so as to form a test shift register when the receive input receives a valid identification key, and the module connecting the storage cells so as to form randomly a diversion circuit when the input does not receive a valid identification key. The invention allows the electronic circuit to be protected against fraudulent access in read or write mode. The invention also relates to a smart card including this electronic circuit.

11 Claims, 2 Drawing Sheets

U.S. PATENT DOCUMENTS

2005/0166002 A1 * 7/2005 Wallace et al. ............... 711/100

FOREIGN PATENT DOCUMENTS

JP 03278150 A * 12/1991

OTHER PUBLICATIONS

"Scan Based Side Channel Attack on Dedicated hardware implementations of Data Encryption Standard" by Yang et al. International Test Conference, Proceedings. ITC 2004. Publication Date: Oct. 26-28, 2004 pp. 339-344 ISBN: 0-7803-8580-2 INSPEC Accession No. 8291736.*

"Reconfigurable Randomized K-way Graph Partitioning" by Kocan, F. This paper appears in: Euromicro Symposium on Digital System Design, 2003. Proceedings. Publication Date: Sep. 1-6, 2003 On pp. 272-278 ISBN: 0-7695-2003-0 INSPEC Accession No. 7884227.*

French Search Report from related French Application No. 04/00837, filed Jan. 29, 2004.

Patent Abstracts of Japan vol. 2003, No. 01 Jan. 14, 2003, & JP 2002 269523 A, Sep. 20, 2002.

French Search Report from French Patent Application 04-00836, filed Jan. 29, 2004.

Patent Abstracts of Japan, vol. 2003, No. 04, Apr. 2, 2003 & JP 2002 365337 A (Sony Corp.), Dec. 18, 2002.

Jaramillo K. et al. "10 Tips For Successful Scan Design: Part One" EDN Electrical Design News, Cahners Publishing Co. Newton, Massachusetts, US, vol. 45, No. 4, Feb. 17, 2000, pp. 67-73, 75, XP000966353 ISSN: 0012-7515.

* cited by examiner

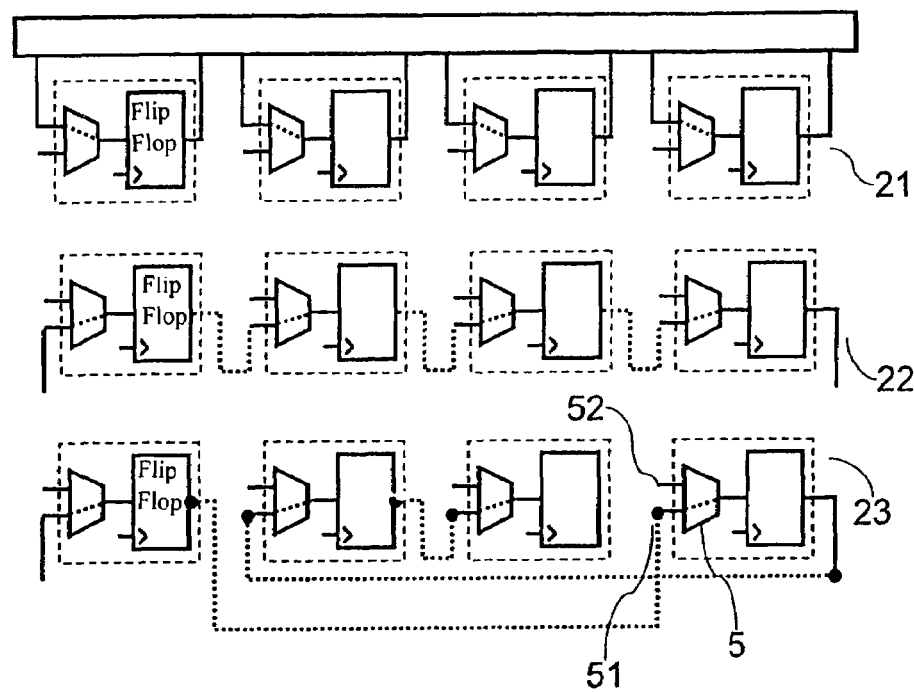
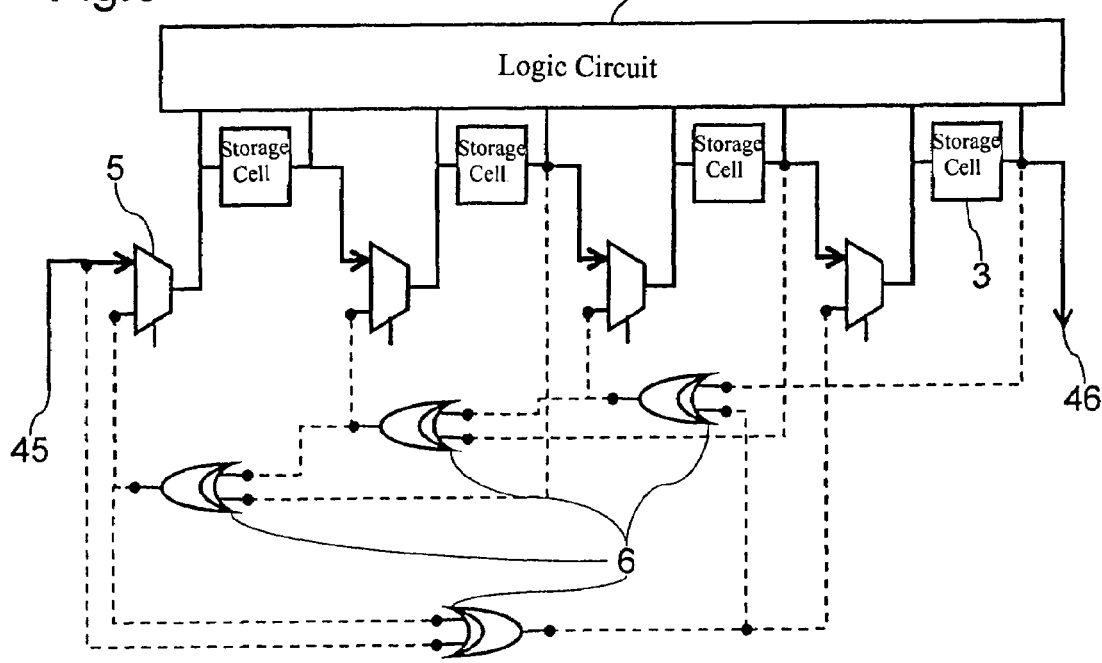

PROTECTING AN INTEGRATED CIRCUIT TEST MODE

BACKGROUND OF THE INVENTION

1. Field of the Invention

The invention relates, in a general terms, to synchronous integrated electronic circuits equipped with combinatorial logic means, flip-flops, and test means.

More specifically, the invention relates to an electronic circuit that includes: a plurality of logic cells; a plurality of configurable cells each including at least one multiplexer and one flip-flop; and a plurality of control conductors connected to the configurable cells and in which flow selectively control signals emitted in operation by a control circuit such as an access controller, the configurable cells adopting selectively, as a function of the control signals, a standard operating mode in which they are operationally connected to some at least of the logic cells with which they engage to from a logic circuit, and a test mode in which these configurable cells are operationally connected in chain to form a shift register equipped with a data input and output.

2. Discussion of the Related Art

It is a well known practice today to test the correct operation of the operational elements of an integrated circuit by imposing and/or setting, at pre-set moments, data values present at certain internal points of this integrated circuit.

A technique of this kind for testing internal paths of an integrated circuit (known as "scanpath" or "internal scan method";) is for example described in the publication by M. Williams and J. Angel, entitled "Enhancing Testability of LSI Circuits Via Test Points and Additional Logic, IEEE Transactions on Computers, vol. C-22, no. 1; January 1973", which is incorporated herein by reference.

According to this technique, each of the flip-flops of the logic circuit, for which it is useful to know the state and/or to impose the content during the standard operation of the integrated circuit, is equipped at its input with a multiplexer.

The different flip-flops and the multiplexers which are associated with them thus constitute as many configurable cells whose accesses are individually controlled by these multiplexers.

The multiplexers of these different configurable cells are collectively controlled by an access controller or "TAP controller" ("TAP" standing for "Test Access Port") which, depending on a selected operating mode, uses this set of configurable cells either as a standard operating circuit, integrated into the logic circuit which it forms with the logic cells, or as a test circuit.

To do this, the TAP controller addresses on different control conductors, by which it is connected to the different configurable cells, control signals, such as a mode control signal, a chaining control signal or a data propagation control signal, which modify the data flow paths within the integrated circuit and which thus allow the controller to capture this data, for the purpose of analyzing it.

In standard operating mode, the TAP controller therefore controls the multiplexers of the configurable cells in such a way that the flip-flops of these cells are connected to the surrounding logic cells to define one or more operating sub-assemblies of the integrated circuit.

In test mode, which is normally triggered on receipt by the TAP controller of a test execution command, this controller produces a chaining control signal to connect the flip-flops of the configurable cells in series in such a way as to form a shift register.

This register notably includes a series input and a series output connected to an output and an input of the TAP controller respectively, and a clock input receiving a clock signal to time the data flow.

Initially, the TAP controller loads data in series into the flip-flops of the configurable cells through the input of the shift register formed by these cells.

Then, the TAP controller changes the switching of the multiplexers to form the operating circuit, and controls the execution of one or more clock cycles by this operating circuit. The data loaded into the flip-flops of the configurable cells is then processed by the operating circuit.

The controller then once again changes the switching of the multiplexers to again form the shift register and retrieves, in series at the output of this shift register, the data stored in the flip-flops of the configurable cells during the last clock cycle.

Despite proven interest in this testing technique, its practical application may under some circumstances prove problematic, particularly in respect of integrated circuits processing confidential data.

Indeed, insofar as activating the test mode may allow a fraudster to read the content of the flip-flops of the configurable cells, this test technique has at first sight the drawback of making such circuits highly vulnerable to fraudulent use.

For example, by stopping, at various intervals of time a process for the internal loading of confidential data into the integrated circuit and by unloading the content of the shift register, a fraudster may be able to obtain information about confidential data, and even reconstitute it.

By activating the test mode, a fraudster may also access the flip-flops of the configurable cells in write mode so as to insert fraudulent data, or to put the integrated circuit in an unauthorized configuration. He may thus for example access a register controlling a security component such as a sensor in order to deactivate it. He may also inject an erroneous data item for the purpose of obtaining information about a confidential data item.

The fraud may in fact adopt two different strategies, the first of which consists in taking control of the TAP controller and in observing the shift register cell content on the external contact blocks, and the second of which consists in taking control of the configurable cells by exciting them by microprobing so as to simulate the control of these cells by the control signals emitted by the TAP controller.

An attempt at fraud in accordance with the first strategy may be blocked by a technique which is the subject of a patent application filed simultaneously by the Proprietor.

SUMMARY OF THE INVENTION

One purpose of the present invention is to propose an electronic circuit designed to foil a fraud attempt in accordance with the second strategy mentioned above.

There is therefore a need for an electronic circuit which resolves one or more of these drawbacks. To this end, the electronic circuit of the invention, comprises:

a logic circuit having a plurality of logic cells;

storage cells able to form a shift register, able to be connected to the logic cells, and having terminals for the reception of respective control signals conducive to entering data into the cells and reading data entering in the cells;

a connection control module having an input for the reception of an identification key, the module connecting the storage cells in accordance with a set order so as to form a test shift register when the receive input receives a valid identification key, and when the storage cells receive a test control signal in read or write mode, and the module connecting the storage cells so as to form randomly a diversion circuit when the input does not receive a valid identification key and when the storage cells receive a test control signal in read or write mode.

According to one variant, the logic cells and the storage cells are connected so as to form an operating circuit when the storage cells do not receive a test read or write control signal.

According to another variant, each storage cell includes:
a multiplexer with its first input having an operating circuit formation connection and with its second input connected to the control module so as to form selectively the test shift register or the diversion circuit;
a D flip-flop with its input connected to the output of the multiplexer and with its output having an operating circuit formation connection and a connection to the control module.

According to another variant, the control module includes:
a random address generator;
a selection circuit having:
a first test address receive input;
a second input connected to the random generator;
an output reproducing the state of the first input when the identification key is valid and otherwise reproducing the state of the second input;
multiplexers, each associated with a storage cell and having:
an input for the formation of the test shift register;
at least one input for the formation of a diversion circuit;
an output connected to the second input of the multiplexer of the associated storage cell;
an addressing input connected to the selection circuit output.

According to yet another variant, the random address generator randomly generates a distinct address for each multiplexer associated with a storage cell.

According to one variant, the control module includes XOR gates the output of which is connected to a diversion circuit formation input and the inputs of which are connected to memory cells or logic cells.

According to another variant, diversion circuit formation input are connected at a pre-set logic lever.

According to another variant, the diversion circuit is a shift register formed by the storage cells connected in random order.

According to yet another variant, the module includes an input and an output for entering and reading data respectively in the cells forming the test shift register.

The circuit may also be expected to include a control circuit, such as an access controller, connected by respective control conductors to the storage cells and delivering in operation said control signals on the control conductors, and applying the data for entry to the module input and reading the data at the module output.

The invention also relates to a smart card that includes an electronic circuit of this kind.

BRIEF DESCRIPTION OF THE DRAWINGS

Other characteristics and advantages of the invention will emerge clearly from the description which is given hereinafter, by way of example and in no way restrictively, with reference to the appended drawings in which:
FIG. 2 is in diagrammatic illustration of the connections when an operating circuit is formed;
FIG. 3 is in diagrammatic illustration of the connections when a test shift register is formed;
FIG. 4 is a diagrammatic illustration of the connections when a diversion circuit is formed;
FIG. 5 shows a variant intended to form a diversion circuit.

DETAILED DESCRIPTION

Figure 1:
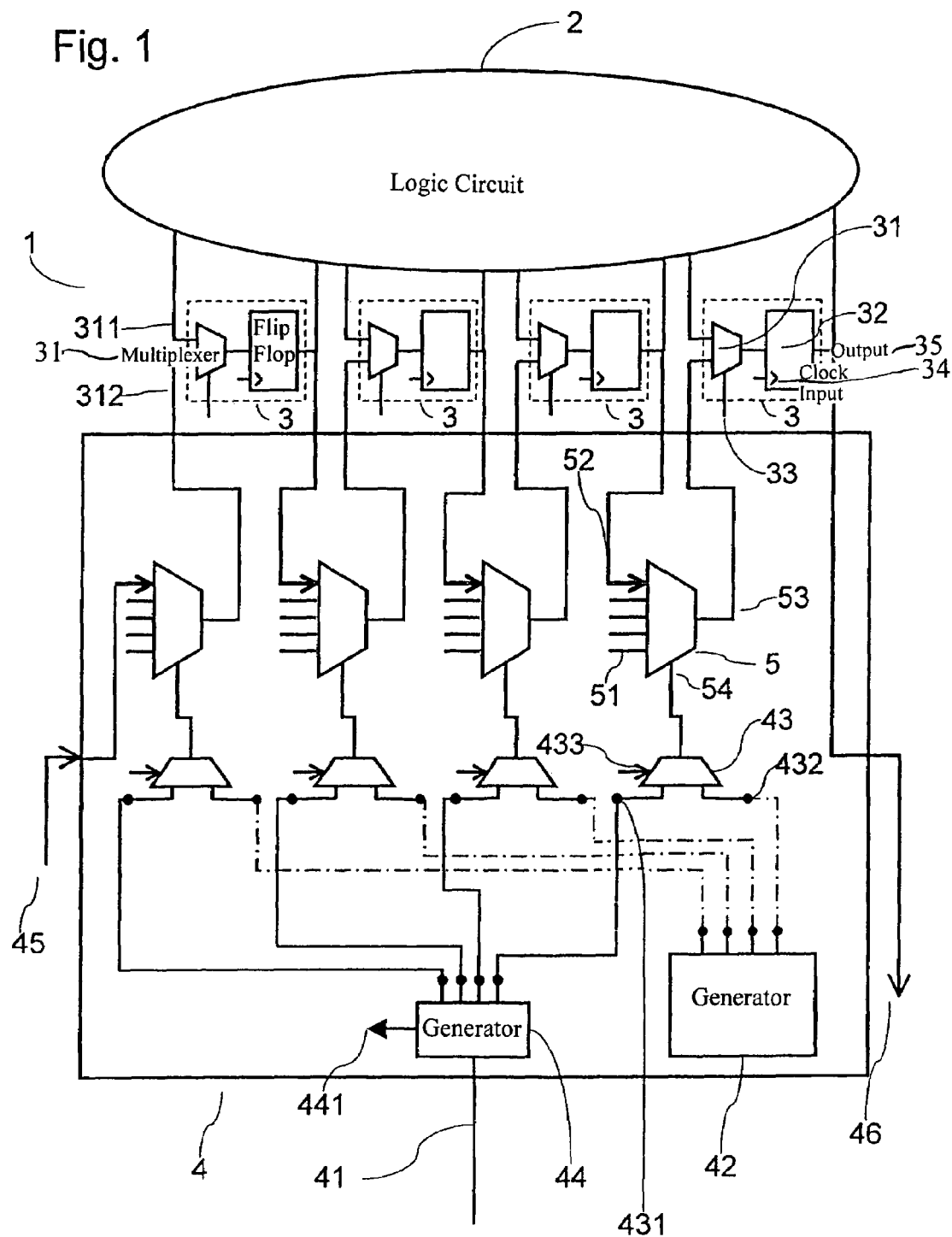
FIG. 1 is a general view of a circuit according to the invention.

A module controls the connection of storage cells associated with a logic circuit and able to form a test shift register. The invention provides the random formation of one or more diversion circuits with the storage cells when a read or write command is applied to these storage cells without an identification key being provided to the control module. In this way, if an attempt is made to enter or to read data fraudulently by forming the test shift register, the data will in fact be entered or read in a diversion circuit. This data will not have the expected effect on the logic circuit, nor will it have any meaning when read. In this way, the fraudulent retrieval of a secret key stored in the logic circuit is much more arduous.

FIG. 1 shows an example of an electronic circuit 1 according to the invention. The circuit 1 is an integrated circuit, including a logic circuit 2 equipped with a plurality of logic cells not shown. The circuit 1 also includes storage cells 3 connected to these logic cells and able to receive control signals for entering or reading data in the cells. The circuit 1 additionally has a module for controlling the connections 4, to which an input and the output of each storage cell are connected. The control module 4 has an input 45 for entering test data and an output for reading data 46.

Storage cells 3 are known per se. A storage cell typically includes a multiplexer 31, of which a first input 311 is connected to the logic circuit 2 and of which a second input 312 is connected to the control module 4 in a way presented in detail below. The multiplexer selection contact block 33 allows either the state of the first input, or the state of the second input to be reproduced selectively at the output of the multiplexer. The output of the multiplexer 31 is connected to the input of a D flip-flop 32. An output of the D flip-flop forms the output of the storage cell and is connected on the one hand to the logic circuit 2, and on the other hand to the control module 4. The D flip-flop has a clock input 34 which may possibly be controlled in test mode at a test frequency different from the normal operating frequency of the circuit 2.

According to the prior art, the contact block 33 typically receives a so-called scan-enabled signal supplied in a way known per se by a TAP controller. As described in the introduction, a test is conducted of the internal path of the logic circuit 2 by initially applying a scan-enabled signal to the contact block 33 of the multiplexers. The storage cells then form a shift register according to the connection shown diagrammatically in FIG. 3. In this way a test circuit 22 is obtained. This shift register is then loaded with the data applied to its input. Next an operating circuit 21 is formed as shown in FIG. 2, by no longer applying the scan-enabled signal to the contact block 33 of each multiplexer. The operating circuit 21 is led to execute one or more clock cycles with the loaded data. The test circuit 22 is the formed again and then the data entered in the shift register is read in series at its output.

The invention aims particularly to protect the electronic circuit against an attack by microprobing. Such an attack may include applying a microprobe to a control of the contact blocks 33 so as to form the test shift register fraudulently and in applying another microprobe so as to enter or read data in this shift register. The connection module 4 only forms the test shift register when it receives a correct identification key.

The connection module 4 has an input 41 for the reception of an identification key. This identification key may be presented in the form of a word with an appropriate number of bits. If a correct key is applied to the input 41, the module 4 connects the output 35 of a storage cell to the second input 312 of the multiplexer 31 of another storage cell, in a set order. The module 4 connects the input 45 to the input 312 of the multiplexer 32 of the first storage cell of the test shift register. The module 4 connects the output of the last storage cell of the test shift register to the output 46. In this way, when the contact blocks 33 receive a scan-enable signal, the test shift register is formed as shown in FIG. 3 and data can be entered or read by the input 45 and the output 46.

If no identification key is applied to the input 41 or if an erroneous identification key is applied, the module 4 connects the inputs 312 in such a way that the application of the scan-enable signal to the contact block 33 generates a diversion circuit 23 as shown in FIG. 4. The connection of this diversion circuit are expected to be fixed randomly, by connection of flip-flops, logic gates or pre-set logic states to the input 312. The connections of the diversion circuits 23 may in particular be expected to be modified at each clock cycle of the electronic circuit.

FIG. 1 shows in detail a possible embodiment of a connection module 4 according to the invention. The module 4 has multiplexers 5. The output 53 of each multiplexer 5 is connected to the input 312 of an associated storage cell. The multiplexer has an input 52 connected to the output of another storage cell. This connection is intended to form the test shift register 22.

The module 4 has a multiplexer 43 for each multiplexer 5. The output of a multiplexer 43 is connected to the selection contact block 54 of the associated multiplexer 5. The multiplexer 43 is provided so as to apply either a test address or a diversion address to the selection contact block 54.

To this end, the module 4 has a test address generator 44. The generator 44 is connected to the input 41 and therefore receives the keys applied to this input. The generator 44 compares the key received with an identification key which it stores. When the received key is identical to the stored identification key, the generator 44 provides the addresses corresponding to the test circuit to the input 431 of the multiplexers 43. The generator 44 additionally has an output 441 connected to the selection contact block 433 of the multiplexer 43. The generator 44 applies to the output 441 a validation signal when the identification key received is correct.

The module 4 has a random address generator 42. The generator 42 randomly applies an address to an input 432 of a multiplexer 43. The addresses applied to the different contact blocks 432 are preferably generated randomly in a disassociated way.

When a validation signal is applied by the output 441 to the contact block 433, the multiplexer 43 reproduces the test address at output. The associated multiplexer 5 thus reproduces at its output 53 the state of its input 52. In the absence of a validation signal, the multiplexer 43 reproduces at output the diversion address applied by the random generator. The multiplexer 5 then reproduces at output the state of the input 51 or 52 designated by the diversion address.

The multiplexer 5 may have only an input 51 and an input 52. Indeed, if random multiplexing is carried out between these two inputs for each multiplexer 5, diversion circuit 23 may also be formed randomly. Of course, the greater the number of inputs 51, the larger the number of randomly generated diversion circuit may be. The number of diversion circuits generated also grows with the number of storage cells connected to the module 4.

FIG. 5 shows an example of an embodiment of a diversion circuit. The circuit shown in broken lines connects the input 51 of the multiplexer 5 to the XOR gate output. Using XOR gates allows the number of possible diversion circuits to be increased. It is possible to apply to the input of a XOR gate the output of a storage cell, a pre-set logic state or any other signal able to make the diversion circuit random and unrepresentative of the test circuit.

As shown in FIG. 4, the diversion circuits formed may possibly be expected to be shift registers with their configuration changing randomly at regular intervals.

Although an example has previously been described in which the connection of each storage cell in the test shift register can be modified, it is also conceivable to simplify the electronic circuit 1 by applying a random connection only to a limited number of storage cells 3.

Depending on the configuration of the electronic circuit 1, the man skilled in the art will choose whether or not to include therein a control circuit such as a TAP controller. The connection module 4 might be expected to be integrated into a TAP controller. The controller will deliver in a way known per se any other signal necessary for reading or writing in the test shift register. The electronic circuit may also be without a TAP controller and be controlled by an external TAP controller connected to an input/output interface of the electronic circuit.

The electronic circuit 1 may be integrated into a smart card.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. Electronic circuit, including:
   a logic circuit having a plurality of logic cells;
   storage cells able to form a shift register, able to be connected to the logic cells, and having terminals for the reception of respective control signals conducive to entering data into the cells and reading data entered in the cells; and
   a connection control module having an input for the reception of an identification key, the module connecting the storage cells in a pre-set order so as to form a test shift register when the receive input receives a valid identification key, and when the storage cells receive a test control signal in read or write mode, and the module connecting the storage cells so as to form randomly a diversion circuit when the input does not receive a valid identification key and when the storage cells receive a test control signal in read or write mode.

2. Electronic circuit according to claim 1, wherein the logic cells and the storage cells are connected so as to form an operating circuit when the storage cells do not receive a test read or write control signal.

3. Electronic circuit according to claim 2, wherein each storage cell includes:
   a multiplexer with its first input having a connection for the formation of an operating circuit and with its second input connected to the control module so as to form selectively the test shift register or the diversion circuit;
   a D flip-flop with its input connected to the output of the multiplexer and with its output having a connection for the formation of an operating circuit and a connection to the control module.

4. Electronic circuit according to claim 3, wherein the control module includes:
- a random address generator;
- a selection circuit having:
- a first input for the reception of a test address;
- a second input connected to the random address generator;
- an output reproducing the state of the first input when the identification key is valid and otherwise reproducing the state of the second input; and
- multiplexers, each associated with a storage cell and having:
- an input for the formation of the test shift register;
- at least one input for the formation of a diversion circuit;
- an output connected to the second input of the multiplexer of the associated storage cell;
- an addressing input connected to the selection circuit output.

5. Electronic circuit according to claim 4, wherein the random address generator randomly generates a distinct address for each multiplexer associated with a storage cell.

6. Electronic circuit according to claim 4, wherein the control module includes XOR gates the output of which is connected to a diversion circuit formation input and the inputs of which are connected to memory cells or logic cells.

7. Electronic circuit according to claim 6, wherein inputs for the formation of a diversion circuit are connected at a pre-set logic level.

8. Electronic circuit according to claim 1, wherein the diversion circuit is a shift register formed by the storage cells connected in random order.

9. Electronic circuit according to claim 1, wherein the module includes an input and an output for entering and reading data respectively in the cells forming the test shift register.

10. Electronic circuit according to claim 9, further comprising a control circuit, such as an access controller, connected by respective control conductors to the storage cells and delivering in operation said control signals on the control conductors, and applying the data for entry to the module input and reading the data at the module output.

11. A smart card comprising the electronic circuit of claim 1.

* * * * *

UNITED STATES PATENT AND TRADEMARK OFFICE
CERTIFICATE OF CORRECTION

| | | |
|---|---|---|
| PATENT NO. | : 7,512,852 B2 | Page 1 of 1 |
| APPLICATION NO. | : 11/041514 | |
| DATED | : March 31, 2009 | |
| INVENTOR(S) | : Frédéric Bancel et al. | |

It is certified that error appears in the above-identified patent and that said Letters Patent is hereby corrected as shown below:

On the title page, in the Abstract, line 3, the word "connecting" should be "connection";

In the Specification
At column 1, line 19, "from" should be "form";
        line 27, "this" should be "the";
        line 36, "of" should read "in";
        line 60, delete the second occurrence of the word "the";
At column 2, line 61, "entering" should be "entered";
At column 3, line 4, "input" should be "inputs";
At column 4, line 28, insert --test-- between "reading" and "data 46.";
        line 56, "the" should be "then";
At column 5, line 16, "connection" should be "connections";
        line 19, "input" should be "inputs";
        lines 60 and 63, "circuit" should be "circuits";
At column 6, line 1, "multiplexer" and "output" should be "multiplexers" and "outputs".

Signed and Sealed this
Twenty-first Day of July, 2015

Michelle K. Lee
*Director of the United States Patent and Trademark Office*